United States Patent

Cheng

[11] Patent Number: 6,091,866
[45] Date of Patent: Jul. 18, 2000

[54] OPTICAL ISOLATOR

[76] Inventor: Yihao Cheng, 36 Meadowbreeze Drive, Kanata, Ontario, Canada, K2M 2L6

[21] Appl. No.: 09/144,447

[22] Filed: Sep. 1, 1998

[51] Int. Cl.⁷ .............................. G02B 6/00; G02B 5/30
[52] U.S. Cl. ............................ 385/11; 385/15; 385/24; 385/31; 359/484; 359/494; 359/497
[58] Field of Search ................... 385/11, 15, 24, 385/31, 33, 39; 359/484, 494, 497

[56] References Cited

U.S. PATENT DOCUMENTS

| | | | |
|---|---|---|---|
| 4,756,607 | 7/1988 | Watanabe et al. | 350/375 |
| 5,204,771 | 4/1993 | Koga | 359/281 |
| 5,237,445 | 8/1993 | Kuzuta | 359/281 |
| 5,278,853 | 1/1994 | Shirai et al. | 372/37 |
| 5,408,491 | 4/1995 | Hirai et al. | 372/92 |
| 5,446,578 | 8/1995 | Chang et al. | 359/282 |
| 5,471,340 | 11/1995 | Cheng et al. | 359/281 |
| 5,499,307 | 3/1996 | Iwatsuka | 385/11 |
| 5,588,078 | 12/1996 | Cheng et al. | 385/33 |
| 5,689,359 | 11/1997 | Kurata et al. | 359/281 |
| 5,689,360 | 11/1997 | Kurata et al. | 359/281 |
| 5,734,762 | 3/1998 | Ho et al. | 385/11 |
| 5,768,005 | 6/1998 | Cheng et al. | 359/281 |
| 5,774,264 | 6/1998 | Konno et al. | 359/497 |
| 5,835,270 | 11/1998 | Urino et al. | 359/484 |
| 5,991,076 | 11/1999 | Cheng | 359/495 |
| 6,014,244 | 1/2000 | Chang | 359/281 |
| 6,028,702 | 2/2000 | Sasaki | 359/484 |

*Primary Examiner*—Brian Healy
*Attorney, Agent, or Firm*—Neil Teitelbaum & Associates

[57] ABSTRACT

A multi-stage optical isolating device having at least three stages includes birefringent crystals for separating shifting and combining an incoming beam of light into orthogonal polarized beams. The multi-stage device also includes at least three Faraday rotators that rotate incoming light propagating through the device in a same direction. The inclusion of a reciprocal rotator in the form of a half-wave plate advantageously obviates orienting the Faraday rotators differently.

15 Claims, 8 Drawing Sheets

COUPLING LOSS : $COS^\theta(d_f)$
ISOLATION : $SIN^\theta(d_f)$

OPTICAL ISOLATOR

FIELD OF THE INVENTION

This invention relates to an arrangement of optical isolator components more particularly to a multi-stage optical isolator.

BACKGROUND OF THE INVENTION

Optical isolators are one of the most ubiquitous of all passive optical components found in most optical communication systems. Optical isolators are generally used to allow signals to propagate in a forward direction but not in a backward direction. These isolators are often used prevent unwanted back reflections from being transmitted back to a signal's source. It is generally known that optical isolators are to some extent, wavelength dependent devices. They provide a greater amount of isolation for some wavelengths of light and less isolation for other input wavelengths of light.

One prior art polarization independent optical isolator is described in United States Pat. No. RE 35,575 issued Jul. 29, 1997 in the name of Pan and entitled Optical Isolator. Pan describes an isolator having an input fibre 17, an output fibre 18 wherein light is transmitted from the input to the output fibre is transmitted and wherein light propagating in a reverse direction from output to input is blocked. The optical isolator described has a glass ferrule 10 into which the input fibre 17 is inserted. The ferrule 10 helps align the fibre. Signals from the end of the input fibre are transmitted by a first GRIN lens 11 which collimates the light from the end of the fibre. The collimated light from the GRIN lens 11 is then passed through a polarizer 12 in the form of a birefringent crystal wedge. The polarizer separates the incident light from the GRIN lens into a ray polarized along the crystal's optical axis. The light from the polarizer is then rotated by a Faraday rotator 13 which rotates the polarized light by 45 degrees. The rotator is typically formed of garnet doped with impurities or, alternatively, YIG, placed in a permanent magnet.

A second polarizer 14 then recombines the rotated light. Like the first polarizer 12, the second polarizer 14 is formed by a birefringent crystal wedge. The optical axis of this birefringent crystal wedge. The optical axis of this birefringent crystal is oriented at 45 degrees with respect to the optical axis of the first polarizer. Thus the ordinary ray from the first polarizer is also the ordinary ray of the second polarizer and the extraordinary of the second polarizer. The net result is that after traveling from the first polarizer through the second polarizer, the two collimated rays are negligibly displaced from each other. The two rays are then combined and refocused by a second GRIN lens 15 to a point on the end of the output fibre. Again the end of the output fibre is aligned by a glass ferrule.

In the reverse direction, light from the output fibre 18 is separated by the polarizer 14 into two , an ordinary ray polarized along the axis of the polarizer 14, and an extraordinary ray polarized perpendicularly to the optical axis. When passing back through the Faraday rotator 13, the light in both rays is rotated 45 degrees. This rotation is non-reciprocal with the rotation of light in the forward direction, so that the ordinary ray from the second polarizer 14 is polarized perpendicularly with the optical axis of the first polarizer 12 and the extraordinary ray from the second polarizer 14 is polarized with the optical axis of the first polarizer 12. The ordinary and extraordinary rays from the second polarizer 14 have swapped places incident upon the first polarizer 12. Because of this exchange, the light having passed through the first polarizer 12, does not leave the polarizer 12 in parallel rays. The non-parallel light is focused by the GRIN lens 11 at points which are not located at the end of the input fibre 10. For a more detailed explanation of this type of optical isolator, see, for example, "Compact Optical Isolator for Fibers Using Birefringent Wedges," M. Shirasaki and K. Asomo, Applied Optics, Vol. 21, No. 23 December, 1982, pp. 4296–4299.

An isolated optical coupler is disclosed in U.S. Pat. No. 5,082,343 in the name of Coult et al. issued Jan. 21, 1992. The coupler described in the patent is comprised of a pair of lenses having a wavelength selective device and an isolator disposed therebetween.

Another optical isolator which attempts to improve upon Coult's design is described in U.S. Pat. No. 5,594,821 in the name of the applicant, Yihao Cheng, issued Jan. 14, 1997.

Yet another optical isolator is described in U.S. Pat. No. 5,267,078 in the name of Shiraishi et al.

It is well known that passing a signal through two isolators will provide additional isolation, or for that matter that a two stage isolator will provide more isolation than a same single stage isolator. And yet still further, a three stage isolator will provide more isolation for a wider band of wavelengths than a double stage isolator.

Notwithstanding, there are difficulties associated with making compact multistage isolators, for example having three stages. Simply duplicating the optical components used to fabricate a single stage isolator to make a double stage isolator is not economical and will not produce the most compact device. Hence, attempts have been made to lessen the number of components required to make a multi-stage isolator to fewer than two times the number of elements required to make a single stage isolator. For example, U.S. Pat. No. 5,237,445 in the name of Kuzuta discloses a three stage isolator which employs rutile ($TiO_2$) as birefringent crystals and includes four rutile plates and three Faraday elements. One limiting aspect of Kuzuta's invention is that the rutile plates are required to be quite thick, each having a thickness of $1+\sqrt{2}$. These large crystals are costly and increase the overall size of the device.

Figure 9A:
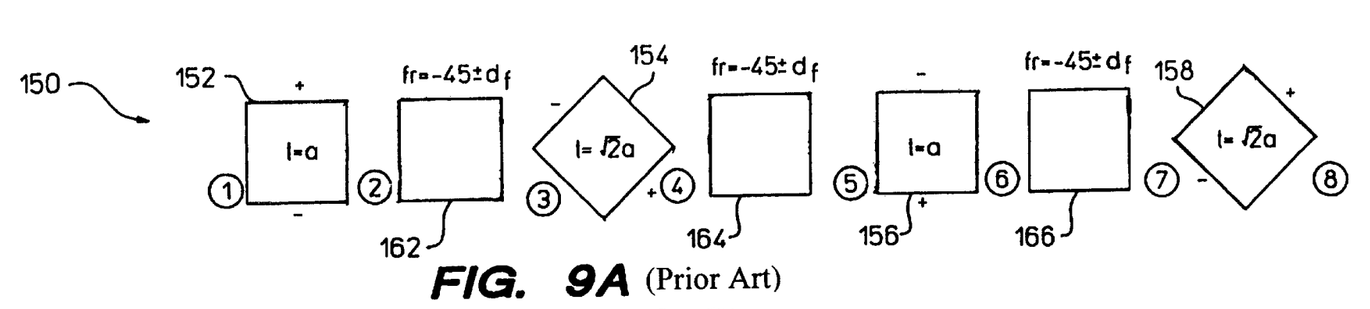
FIG. 9A is a schematic block diagram of a prior art optical isolator.

An other optical isolator is described in U.S. Pat. No. 5,446,578 in the name of Chang et al. Chang et al. in FIG. 9A of the '578 patent illustrate a three stage optical isolator wherein a first and third crystal have a length t=a and wherein a second and fourth crystal have a length of $\sqrt{2}$. Although this design overcomes the disadvantages of Kuzuta wherein each crystal is of a length $1+\sqrt{2}$, Chang et al propose a configuration, which introduces a different disadvantage. In FIG. 9A Chang et al. disclose the use of three Faraday rotators disposed between the four crystals. The second and third Faraday rotators 164 and 166 respectively are oppositely orientated such that rotator 164 non-reciprocally rotates light at −45° where Faraday rotator 166 rotates light propagating through it at +45°. Since the crystal between these two rotators is relatively thin, the oppositely oriented magnetic fields required to effect rotation of the two closely spaced rotators 164 and 166 interfere with each other and adversely effect the performance of the two rotators.

It is therefore an object of this invention to provide a multi-stage optical isolator having at least three stages that obviates the aforementioned disadvantages of Chang et al. and of Kuzuta.

It is therefore an object of this invention to provide an optical isolator that provides substantial isolation and which at the same time is relatively simple and cost effective to manufacture.

It is a further object of this invention to provide a multi-stage isolator that provides isolation for a relatively wide band of signals.

SUMMARY OF THE INVENTION

In accordance with the invention there is provided, multi-stage optical isolator comprising: a birefringent crystal at an input end of the isolator;

a birefringent crystal at an output end of the isolator; and, a first non-reciprocal rotating element, a second birefringent crystal, a second non-reciprocal rotating element, a third birefringent crystal, a third non-reciprocal rotating element and, a reciprocal rotating element disposed between the birefringent crystal at the input end of the device and the birefringent crystal at the output end of the device, said optical elements disposed between the birefringent crystal the input end of the device and the birefringent crystal at the output end of the device being disposed such that input light directed into the birefringent crystal at the input end of the isolator is directed through said elements and is at the output end of the isolator, and to substantially prevent light at the output end directed toward the input end from propagating into the input end of the isolator, wherein the number of birefringent crystals is less than two times the number of non-reciprocal rotating elements.

In accordance with the invention there is further provided, a multi-stage optical isolator comprising:

a first birefringent crystal at an input end of the device for dividing an input beam into two beams having orthogonal polarizations;

a last birefringent crystal at an output end of the device for combining two beams having orthogonal polarizations; and a first non-reciprocal rotating element, a second birefringent crystal, a second non-reciprocal rotating element, a third birefringent crystal, and a third non-reciprocal rotating element disposed in that order between the first and last birefringent crystals, and said isolator further including a reciprocal rotating element disposed between the first and last birefringent crystals, wherein the number of birefringent crystals is less than two times the number of non-reciprocal rotating elements.

BRIEF DESCRIPTION OF THE DRAWINGS

Exemplary embodiments of the invention will now be described in conjunction with the drawings, in which:

FIG. 3A are cross-sectional views of five elements of an array of elements constituting an optical isolator of the prior art where the cross-sectional views are arranged side-by-side in the forward direction of the isolator to illustrate the optical isolator disclosed in the referenced application;

DETAILED DESCRIPTION

Figure 1:
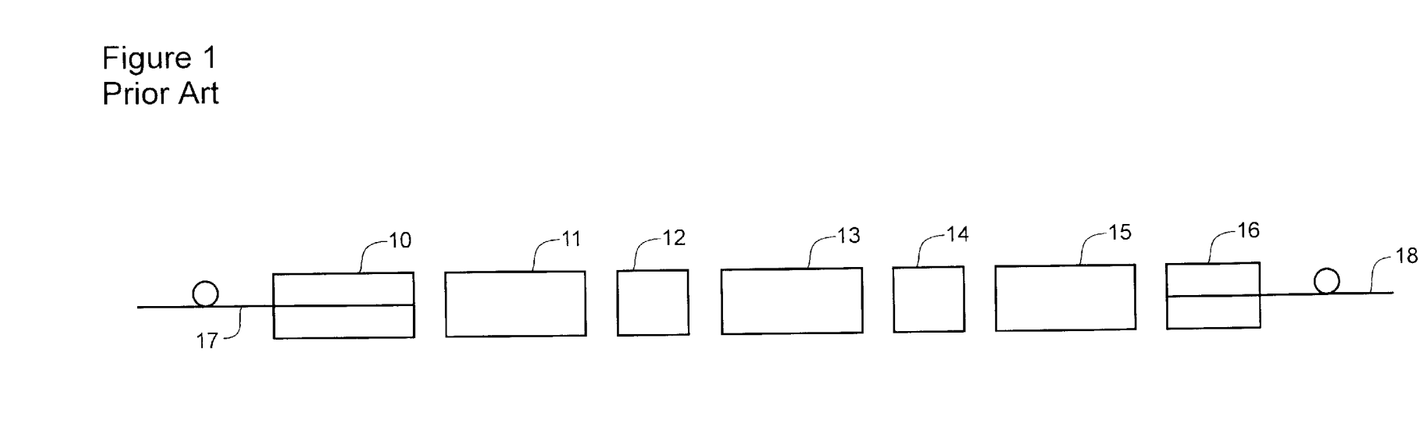
FIG. 1 is a block diagram of a prior art optical isolator.
Figure 1A:
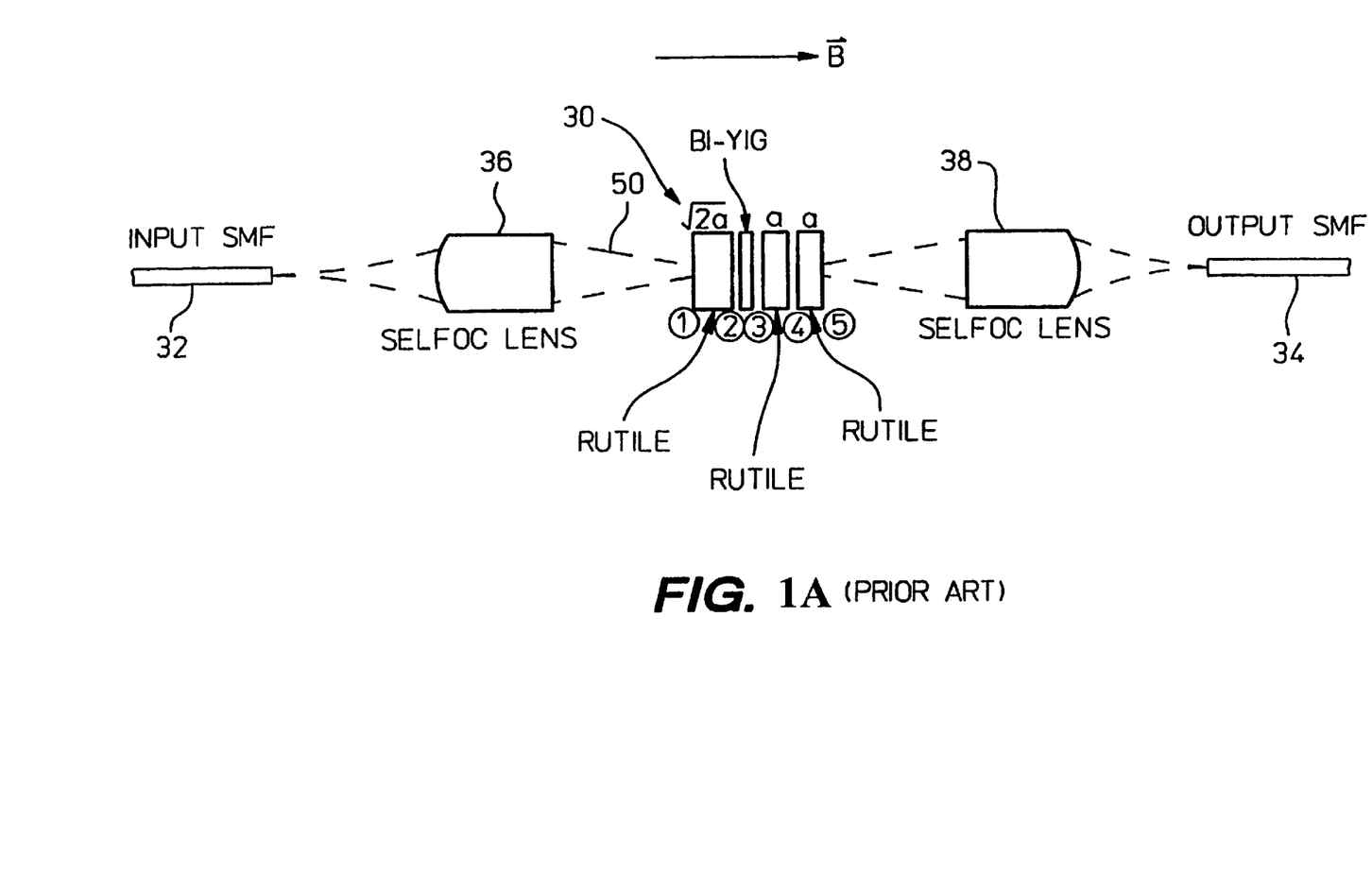
FIG. 1A is a pictorial view block diagram of a prior art polarization dependent optical isolator.

Referring now to FIG. 1A, a conventional optical isolator is shown. This isolator is such that after incident light passes through a first polarizer 1, the plane of polarization of the incident light is rotated at an angle of 45° by a Faraday rotator 2 and the incident light further passes through a second polarizer which has the plane of polarization inclined at 45° with respect to the first polarizer For return light reflected in a direction opposite to the incident light. On the other hand, only a component of the light which coincides in a plane of polarization with the second polarizer 3 traverses the second polarizer 3 and then the plane of polarization thereof is further rotated at 45° by the Faraday rotator 2. It follows from this that the reflected return light which has traversed the Faraday rotator is such that the plane of polarization is rotated at 90° with respect to the first polarizer 1, and thereby the reflected return light cannot reach the entrance side of the incident light. Hence, according to the conventional optical isolator, the reflected return light in the opposite direction is blocked and the function of the optical isolator of this type is thus performed.

FIG. 1A is a side view of an array of elements forming a conventional polarization independent optical isolator. As shown in FIG. 1A, isolator 30 is placed between an input single mode fibre 32 and an output single mode fibre 34, and self focusing lenses 36 and 38 for focusing the light between the two fibres and the isolator. Isolator 30 operates to permit transmission of light in the forward direction from fibre 32 to fibre 34. Any light originating or reflecting from fibre 34 however is greatly reduced in amplitude by the isolator 30 when it is transmitted in the reverse direction to input fibre 32. The operation of the isolator 30 will be explained in reference to FIGS. 3A to 3B.

Figure 2A:
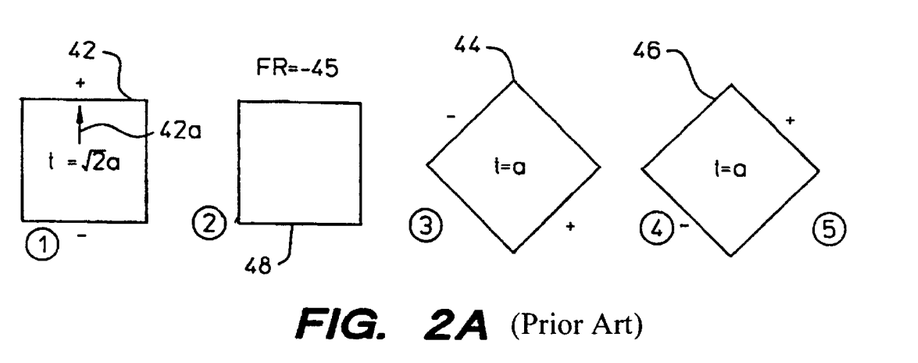
FIG. 2 shows cross sectional views of the four elements of FIG. 1, where the cross-sectional views are arranged side-by-side in the same order as in the array and in the forward direction to illustrate the isolator of FIG. 1.

FIG. 2 is a cross sectional view of elements 42, 48, 44, and 46 taken along planes perpendicular to the path of beam 50 in the forward direction of the beam, where the views are arranged in the same order as in the array of FIG. 1A in the forward direction to illustrate the prior art optical isolator. The walk off directions of (walk off crystal) members 42, 44, and 46 are shown by the (+) and (−) signs, where the walk off direction for light traveling in the forward direction is from the (−) towards the (+) in the figure. For light travelling in the reverse direction the walk off direction is from the (+) towards the (−) in the figure. This convention for illustrating the walk off direction will be used with reference to FIGS. 3A to 3B. As used in this application a walk off crystal is one which causes rays with their planes of polarization parallel to the walk off direction to walk off in the walk off direction, but which leaves rays with planes of polarization orthogonal to the walk off direction unchanged in the walk off direction.

Element 48 is a non-reciprocal rotation element such as a Faraday rotator which rotates any light passing therethrough counter clockwise by approximately 45 degrees. This is illustrated in FIG. 2 by the equation FR=−45°, where the (−) sign indicates rotation in the counterclockwise direction and no sign or (+) sign indicates that the rotation is in the clockwise direction when viewed in the forward direction. Therefore, when viewed in the forward direction, member 44 is rotated by 135 degrees clockwise relative to the crystal 42 and crystal 46 is rotated by 45 degrees clockwise relative to crystal 42. The walk off direction of member 42 in the forward direction is shown by arrow 42a, pointing from the (−) sign towards the (+) sign as shown in FIG. 2. The walk off directions in the forward direction of members 44, 46 also points from the (−) sign towards the (+) sign.

Figure 3A:
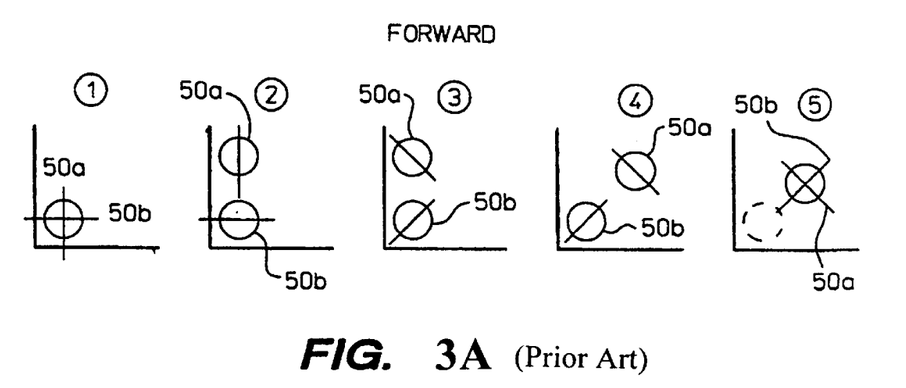
FIGS. 3A and 3B illustrate the positions of side rays passing through the optical isolator of FIGS. 1, 2A in the forward and reverse directions respectively.

In reference to FIG. 1A, if beam 50 at position 1 in the forward direction passes through isolator 30 to emerge at position 5. The effect of isolator 30 on beam 50 is illustrated in FIG. 3A. Positions 1 through 5 in FIG. 3A identify the effects on beam 50 of isolator 30 at each stage during passage of beam 50 and correspond to positions 1 through 5 in FIGS.2 as shown in FIG. 3A, beam 50 impinges on member 42 at position 1 and emerges at 2 into rays 50a, 50b where ray 50a has polarization substantially parallel to 42a and ray 50b has polarization substantially orthogonal to direction 42a. The two rays are rotated by Faraday rotator 48 so that their planes of polarization are shown in position 3 in FIG. 3A. The two rays then impinge upon the member 44 so that ray 50a again diverges so that the positions of the two rays are as illustrated in position 4 in FIG. 3A. Member 46 causes ray 50b to walk off so that the two rays again superimpose at position 5. In such manner isolator 30 causes the two rays to superpose each other when emerging from the isolator.

Figure 3B:
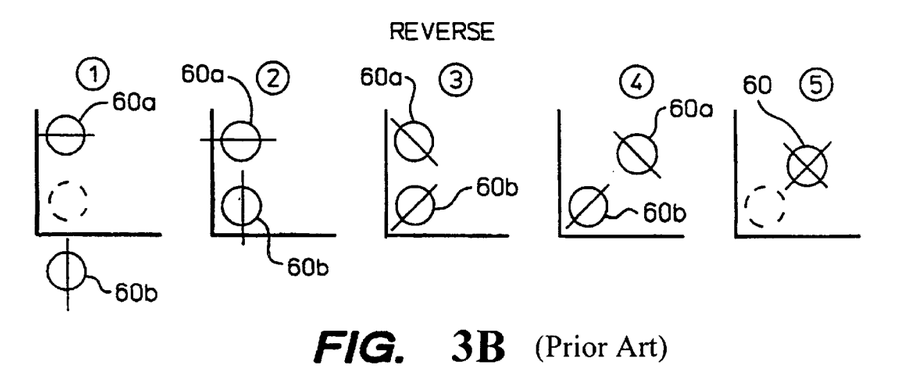
Figure 8A:
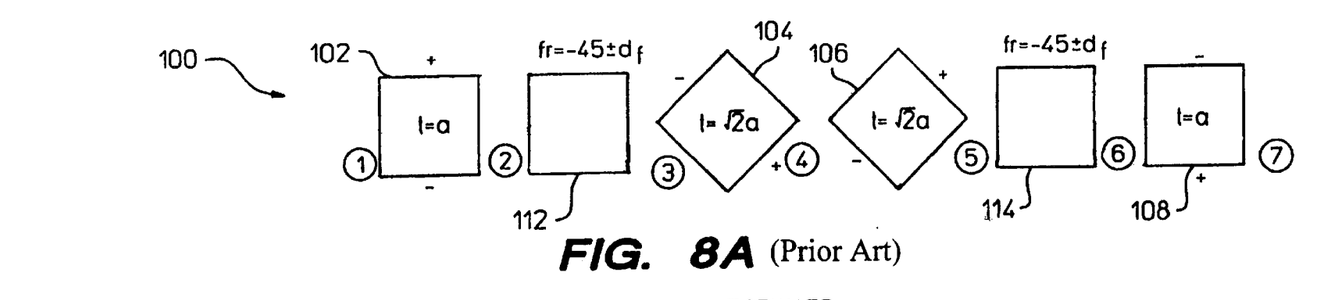
FIG. 8A is a block diagram of a prior art optical isolator.
Figure 8B:
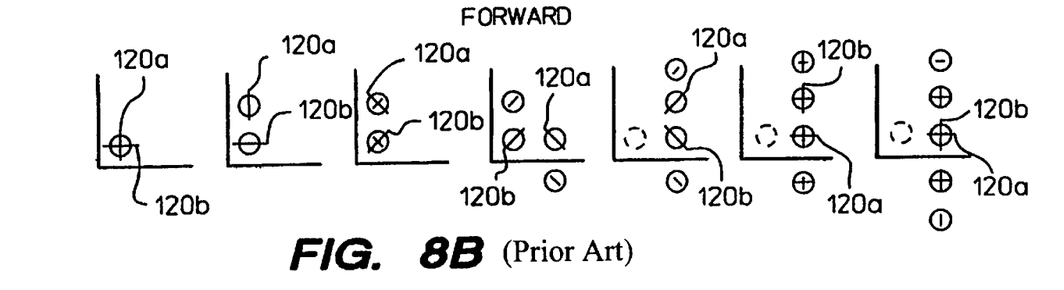
FIGS. 8B and 8C are state diagrams of light propagating through the isolator shown in FIG. 8A.
Figure 8C:
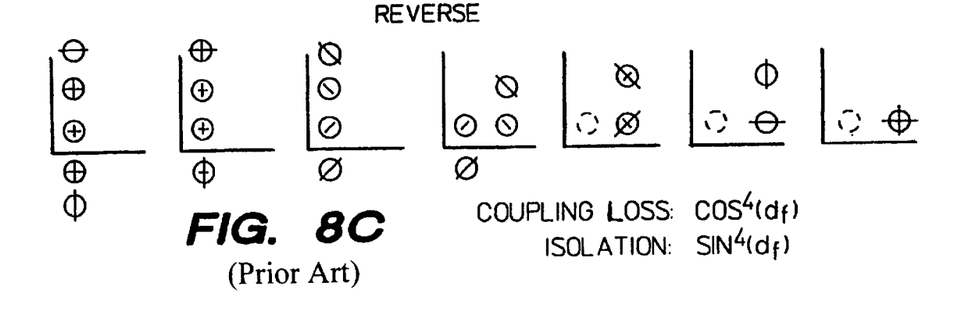
Figure 9B:
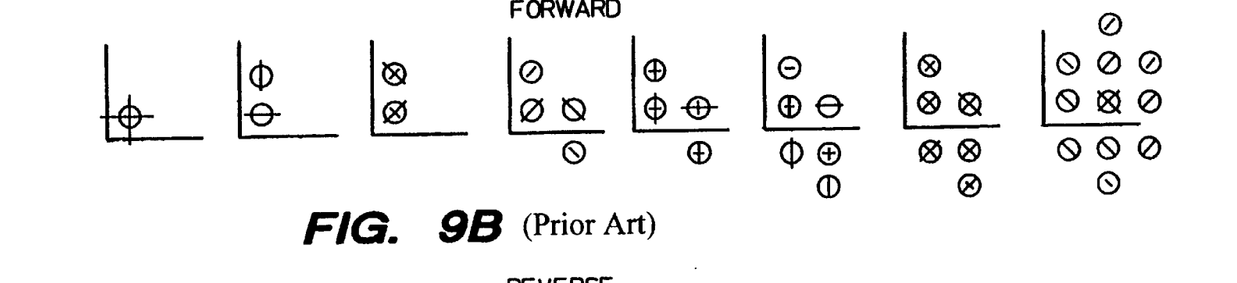
FIGS. 9B and 9C are state diagrams relating to the prior art optical isolator shown in FIG. 9A.
Figure 9C:
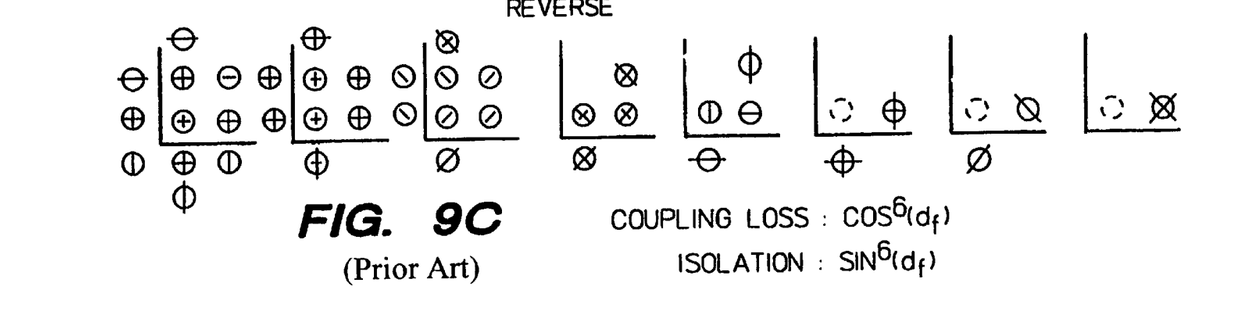

FIG. 3B illustrates the position of beam 60 travelling in reverse direction from position 5 towards position 1. In FIG. 3B and 9C, the location of the input optical fibre is shown as a dashed circle to facilitate recognition of the relative location of the various optical beams in relation to the lateral position of this input optical fiber. As shown in FIG. 3B, beam 60 emerges from member 46 as two rays 60a, 60b. Member 44 further causes ray 60a to walk off so that the positions of the two rays are as shown in position 3 in FIG. 3B. Faraday rotator 48 rotates the two rays in a counter clockwise direction by about 45 degrees. Member 42 causes ray 60b to walk off so that positions of the two rays are as shown in position 1 in FIG. 3B. From FIG. 3B, it is evident that the positions of the two rays 60a, 60b walk away from the original forward travelling direction of beam 50. For this reason, lens 36 of FIG. 1 will not focus beam 60 at the end surface of input fibre 32. In other words, light travelling in the reverse direction from fibre 34 towards fibre 32 will not enter fibre 32. Hence the isolator 30 permits light to be transmitted from fibre 32 to fibre 34 in the forward direction while minimizing the polarization dependence of output power but eliminates or greatly reduces the amount of light travelling in the reverse direction from fibre 34 towards fibre 32. What has been described thus far is the operation of a convention optical isolator described in U.S. Pat. No. 5,446,578 incorporated herein by reference. The same patent describes and illustrates a 3-stage optical isolator in FIG. 9A having seven elements of an array of elements shown in cross-section. This isolator is a polarization preserving optical isolator. FIGS. 9B and 9C illustrate the positions of light of light rays passing through the device of FIG. 9A in the forward and reverse directions respectively. The device of FIG. 9A differs from that of FIG. 8A of U.S. Pat. No. 5,446,578 shown here as FIG. 6 in that it includes an additional Faraday rotator and in the particular orientations of the seven elements therein. The particular orientations of the four walk off crystals 152–158 and three Faraday rotators 162–166 in FIG. 9A enable the above functions to be accomplished.

Figure 4A:
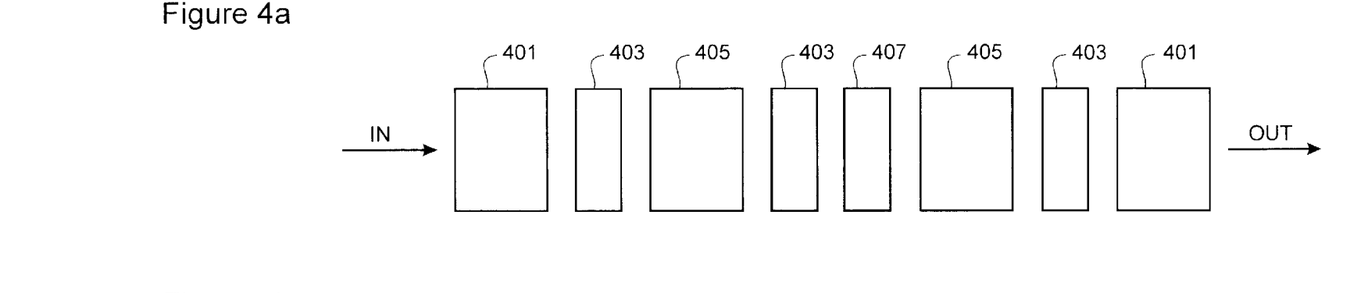
FIG. 4A is a schematic block diagram of an optical isolator in accordance with this invention.
Figure 4B:
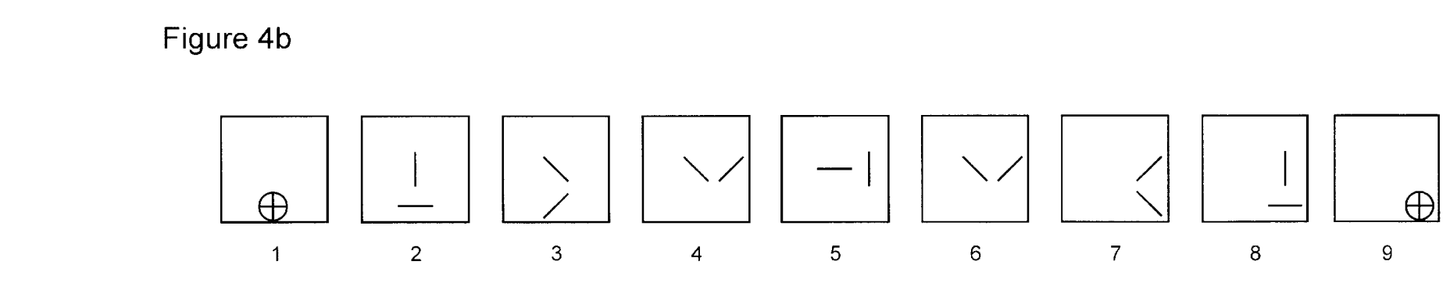
FIG. 4B is a diagram depicting the states of the light as input light is propagated from an input end to an output end of the isolator of FIG. 4A.
Figure 4C:
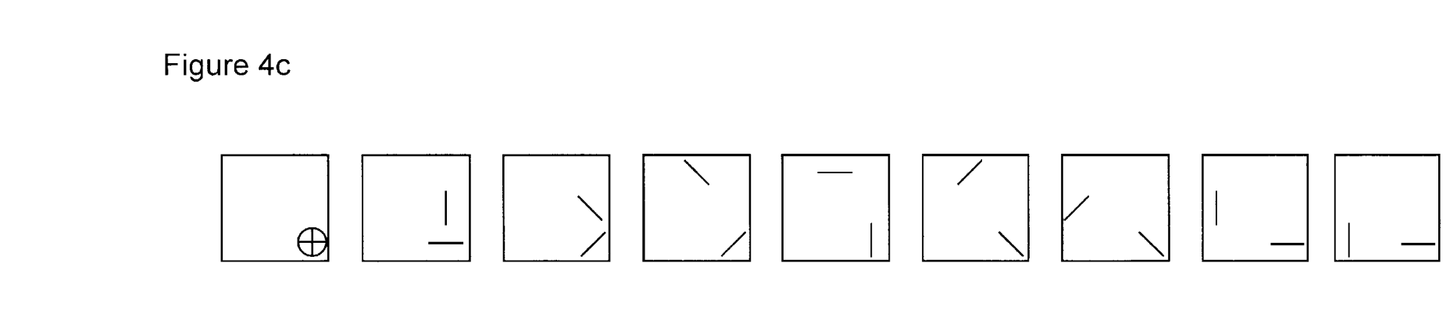
FIG. 4C is a diagram depicting the states of the light as reflected light is reflected backwards from the output end to the input end of the isolator of FIG. 4A.

Turning now to FIGS. 4A, 4B and 4C a block diagram of an optical isolator in accordance with an embodiment of this invention is shown. From the input end to the output end is disposed a first birefringent crystal 401 having a thickness t, a first Faraday rotator (FR) 403, a second birefringent crystal 405 having a thickness √2 a second Faraday rotator (FR) 403, a reciprocal rotator in the form of a half-wave plate 407, a third birefringent crystal 405 having a thickness √2, a third Faraday rotator (FR) 403, and a fourth birefringent crystal 401 having a thickness t. It should be noted that the single half-wave plate 407 can alternatively be disposed at another location between the first and fourth birefringent crystals 401. A significant advantage of this invention, is that it obviates the requirement to provide closely spaced Faraday rotators that require counter propagating fields to effect rotation in opposite directions. As was described in the background of this invention, the provision of opposite (and overlapping) fields to effect rotation of two adjacently disposed Faraday rotators is not preferred. In accordance with this invention, the inclusion of the reciprocal rotator 407 provides an extra 45 degrees of rotation and allows the Faraday rotators to rotate an incoming beam in a same direction.

The operation of the optical circuit of FIG. 4A is described in conjunction with FIGS. 4B and 4C wherein FIG. 4B depicts the polarization states of a beam of light launched into an input optical fibre 402 (shown on the left of FIG. 4A) as it propagates and it is separated into two orthogonal beams and is subsequently combined into a single beam at an output fibre 404 (shown on the right in the same figure). States 1 through 8 depict the beam as it impinges upon elements 401, 403, 405, 403, 407, 405, 403, and the fourth crystal 401 respectively; and, state 9 depicts the combined beam after it has exited the fourth crystal 401. In state 1 the beam is launched into the crystal 401 ( on the left, at the input end) and is shown in state 2 as being separated into two orthogonal beams. The two beams are subsequently rotated counterclockwise by the first FR 403 in state 3. In state 4 the beams are shown shifted by the second crystal 405. State 5 shows the beams rotated by the second FR 403. State 6 shows the beams after being rotated by the reciprocal rotator 407. The two beams are shown shifted in state 7 by the third crystal 405 and in state 8 are shown rotated by 45 degrees by the FR 403. State 9 shown the beams as being combined as they pass through the last crystal 401.

FIG. 4C depicts the beam as it propagates from the output end to the input end such that the in the final state 9, the separated light beams are not combined. Turning now to state 1 in FIG. 4C the beam is shown (as it was in state 9 of FIG. 4B) to be combined. In state 2 the beam is separated after it propagates (backwards from the output end to the input end) through the last crystal 401. In state 3 the beam is rotated by the FR 403. State 4 shows the beams after they are shifted by the crystal 405. State 5 shows the beams after they are rotated counter clockwise by the half wave plate 407. In state 6 the beams are rotated counter clockwise by the FR 403. State 7 shows the beams as they are shifted by the second crystal 405, and state 8 shows the beams after counter clockwise rotation of the Faraday rotator 403. These rotated beams are then shifted as shown by state 9 and are not combined, hence being isolated.

Figure 5:
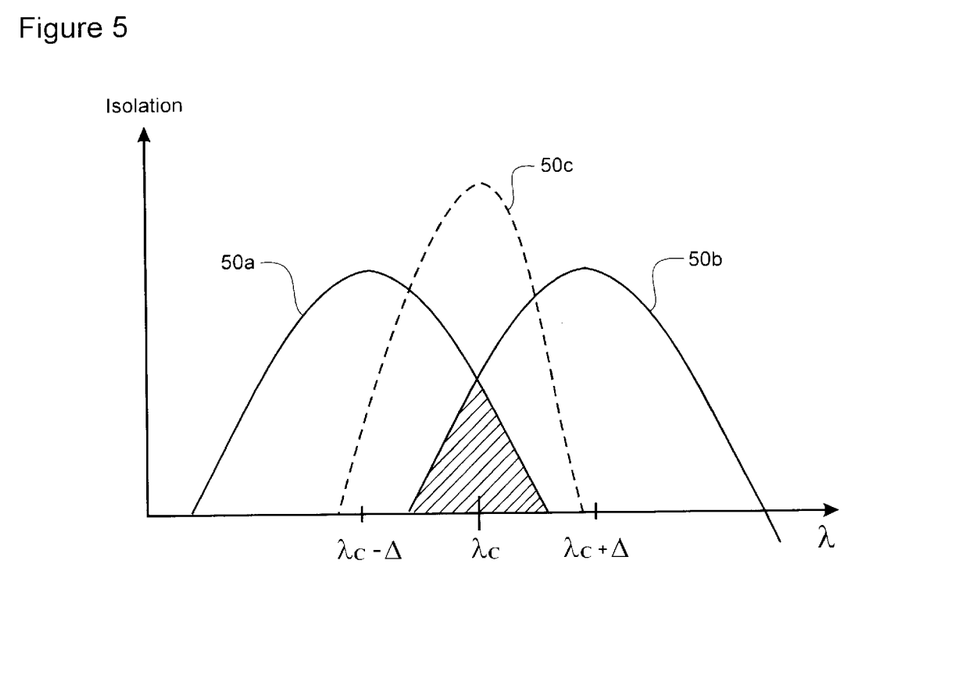
FIG. 5 is plot of isolation versus wavelength of the optical isolator shown in FIG. 7.
Figure 6:
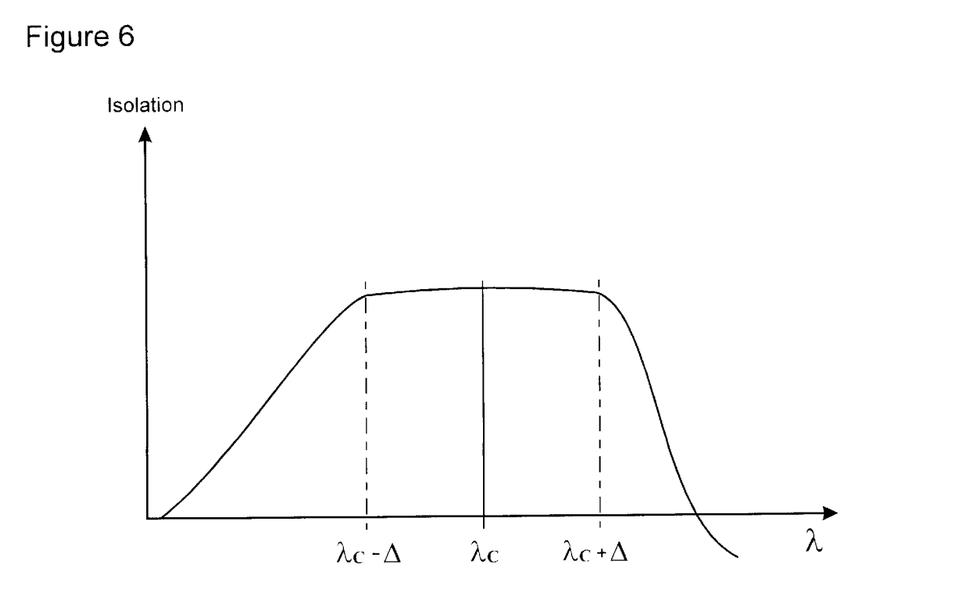
FIG. 6 is a plot of the combined response or the optial isolator shown in FIG. 7.
Figure 7:
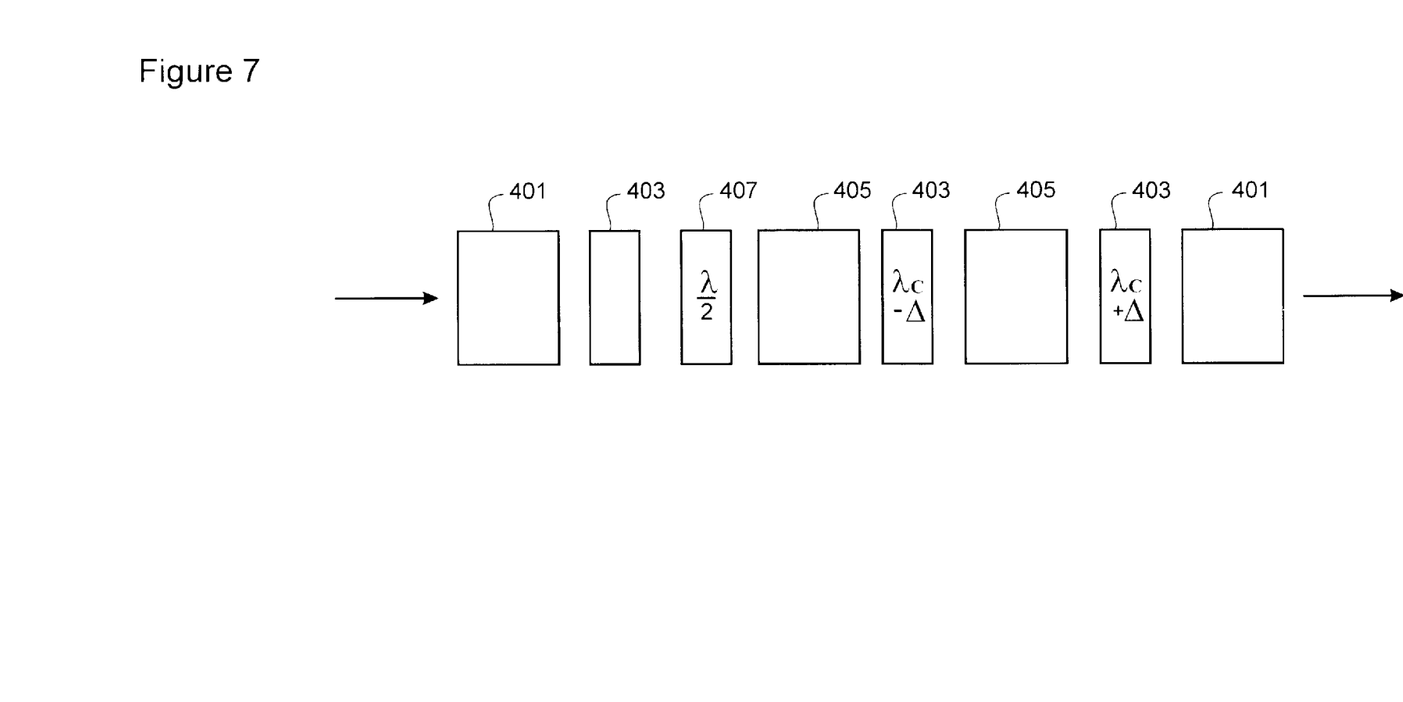
FIG. 7 is schematic block diagram of an alternative embodiment of an optical isolator in accordance with this invention.

In FIG. 7 an alternative embodiment of the invention is shown, wherein the half-wave plate 407 is disposed between the first Faraday rotator 403 and the birefringent crystal 405. Furthermore, in this embodiment two Faraday rotators have their center wavelengths offset from one another and shifted from a wavelength λc by +Δ and −Δ respectively. Curves 50*a* and 50*b* in FIG. 5 are shown which depict the isolation achieved by the two Faraday rotators having their centre wavelengths skewed by 2Δ. The dotted line 50*c* shows the output (isolation versus wavelength) that would be achieved if the two FRs were tuned to the same centre wavelength λc. FIG. 6 illustrates the overall combined output (isolation) response that is realized from both 50*a* and 50*b* by offsetting the centre wavelengths of the FRs. It is noted that the peak isolation is not as great as in the graph of 50*c* however isolation is provided over a broader wavelength band.

Other embodiments of this invention may be envisaged without departing from the spirit and scope of this invention. For example, position of pair crystals 401 of a thickness t may be interchanged with the pair of crystals of thickness √2t. Furthermore the half wave plate 407 can be disposed at other locations between the separating and combining crystals at either end of the isolator.

Conveniently a 4 stage isolator can be manufactured using the principles of this invention.

What is claimed is:

1. A multi-stage optical isolator comprising:

a birefringent crystal at an input end of the isolator;

a birefringent crystal at an output end of the isolator; and, a first non-reciprocal rotating element, a second birefringent crystal, a second non-reciprocal rotating element, a third birefringent crystal, a third non-reciprocal rotating element and a reciprocal rotating element disposed between the birefringent crystal at the input end of the isolator and the birefringent crystal at the output end of the isolator being disposed such that input light directed into the birefringent crystal at the input end of the isolator is directed through said elements, and to substantially prevent light at the output end directed toward the input end from propagating into the input end of the isolator, wherein the number of birefringent crystals is less than two times the number of non-reciprocal rotating elements.

2. A multi-stage optical isolator as defined in claim 1 wherein the number of birefringent crystals is an even number.

3. A multi-stage optical isolator as defined in claim 1 wherein the second and third birefringent crystals having a thickness of √2 times the thickness of the birefringent crystal at the input end.

4. A multi-stage optical isolator as defined in claim 2 wherein the second and third birefringent crystals having a thickness of √2 times the thickness of the birefringent crystal at the input end.

5. A multi-stage optical isolator as defined in claim 1 wherein the isolator is a three-stage device.

6. A multi-stage optical isolator as defined in claim 4 wherein the isolator is a three-stage device.

7. A multi-stage optical isolator as defined in claim 1 wherein the reciprocal rotating element is a half-wave plate.

8. A multi-stage optical isolator as defined in claim 6 wherein the reciprocal rotating element is a half-wave plate.

9. A multi-stage optical isolator as defined in claim 1 wherein the non-reciprocal rotating elements are Faraday rotators.

10. A multi-stage optical isolating device comprising:

a first birefringent crystal at an input end of the device for dividing an input beam into two beams having orthogonal polarizations;

a last birefringent crystal at an output end of the device for combining two beams having orthogonal polarizations; and a first non-reciprocal rotating element, a second birefringent crystal, a second non-reciprocal rotating element, a third birefringent crystal, and a third non-reciprocal rotating element disposed in that order between the first and last birefringent crystals, and said device further including a reciprocal rotating element disposed between the first and last birefringent crystals, wherein the number of birefringent crystals is less than two times the number of non-reciprocal rotating elements.

11. A multi-stage optical isolating device as defined in claim 10, wherein the non-reciprocal rotating elements are Faraday rotators and wherein the reciprocal rotating element is a half-wave plate.

12. A multi-stage optical isolating device as defined in claim 10, wherein the Faraday rotators are oriented and configured to rotate light propagating therethrough from the input end to the output end in a same direction.

13. A multi-stage optical isolating device as defined in claim 1 1, wherein the Faraday rotators are oriented and configured to rotate light propagating therethrough from the input end to the output end in a same direction.

14. A multi-stage optical isolating device as defined in claim 12, wherein two of the Faraday rotators effect a 45° rotation for a different central wavelength so as to provide a wide band isolation response.

15. A multi-stage optical isolating device as defined in claim 13, wherein two of the Faraday rotators effect a 45° rotation for a different central wavelength so as to provide a wide band isolation response.

* * * * *